United States Patent [19]

Guinon

[11] Patent Number: 5,415,046

[45] Date of Patent: May 16, 1995

[54] TIME GATED LISTENING DEVICE FOR MACHINERY ANALYSIS

[76] Inventor: Walter J. Guinon, 3 Jefferson St., Newburyport, Mass. 01950

[21] Appl. No.: 957,154

[22] Filed: Oct. 7, 1992

[51] Int. Cl.⁶ .................. G01M 13/02; G01H 1/00; G01H 11/00; G01N 29/00
[52] U.S. Cl. ........................................ 73/660; 73/593
[58] Field of Search ................ 73/587, 593, 607, 660

[56] References Cited

U.S. PATENT DOCUMENTS

| | | | |
|---|---|---|---|
| 4,298,948 | 11/1981 | Davis | 73/660 |
| 4,426,641 | 1/1984 | Kurihara et al. | 73/660 |
| 4,704,906 | 11/1987 | Churchill et al. | 73/660 |

Primary Examiner—Richard E. Chilcot, Jr.
Assistant Examiner—William L. Oen

[57] ABSTRACT

A microphone, coupled to the machinery under test, is connected via a blanking amplifier to a headset speaker. A sync generator, coupled to the machinery, generates a pulse each time the machinery passes through a reference position. This sync pulse sequence is the input to a phase locked loop which produces an internal representation of the instantaneous phase position of the machinery. Each time this phase position reaches an operator designated phase position, the blanking amplifier is unblanked for a duration designated by the operator so that only the operator designated segment of the machinery cycle is audible.

1 Claim, 2 Drawing Sheets

TIME GATED LISTENING DEVICE FOR MACHINERY ANALYSIS

BACKGROUND OF THE INVENTION

1. Field of the Invention

The invention is a device for the analysis and trouble shooting of cyclical machinery.

2. Description of the Prior Art

Repairmen and machine designers often use a stethoscope or the unaided ear to listen to the operation of rotating and reciprocating machinery. However the total sound output of the machinery often desensitizes the ear and masks low level sound signatures of important segments of the machinery cycle.

The instant invention allows an operator to listen to only a desired segment of the ,machinery cycle while blanking the sounds of other parts of the cycle thus greatly reducing masking and desensitization.

SUMMARY OF THE INVENTION

The invention is a listening device for testing and diagnosing faults in cyclically operating machinery. A microphone is coupled to the machinery under test. The output of the microphone is connected to a headset speaker only during an operator designated segment of the machinery cycle. This allows an operator to focus his attention on the sound and vibration of a chosen segment of a machinery cycle while blanking the distraction, desensitization and masking noise due to other parts of the cycle.

It is an object of the invention to provide a more sensitive and selective means to analyze the internal workings of rotating machinery.

DESCRIPTION OF THE PREFERRED EMBODIMENT

Figure 1:
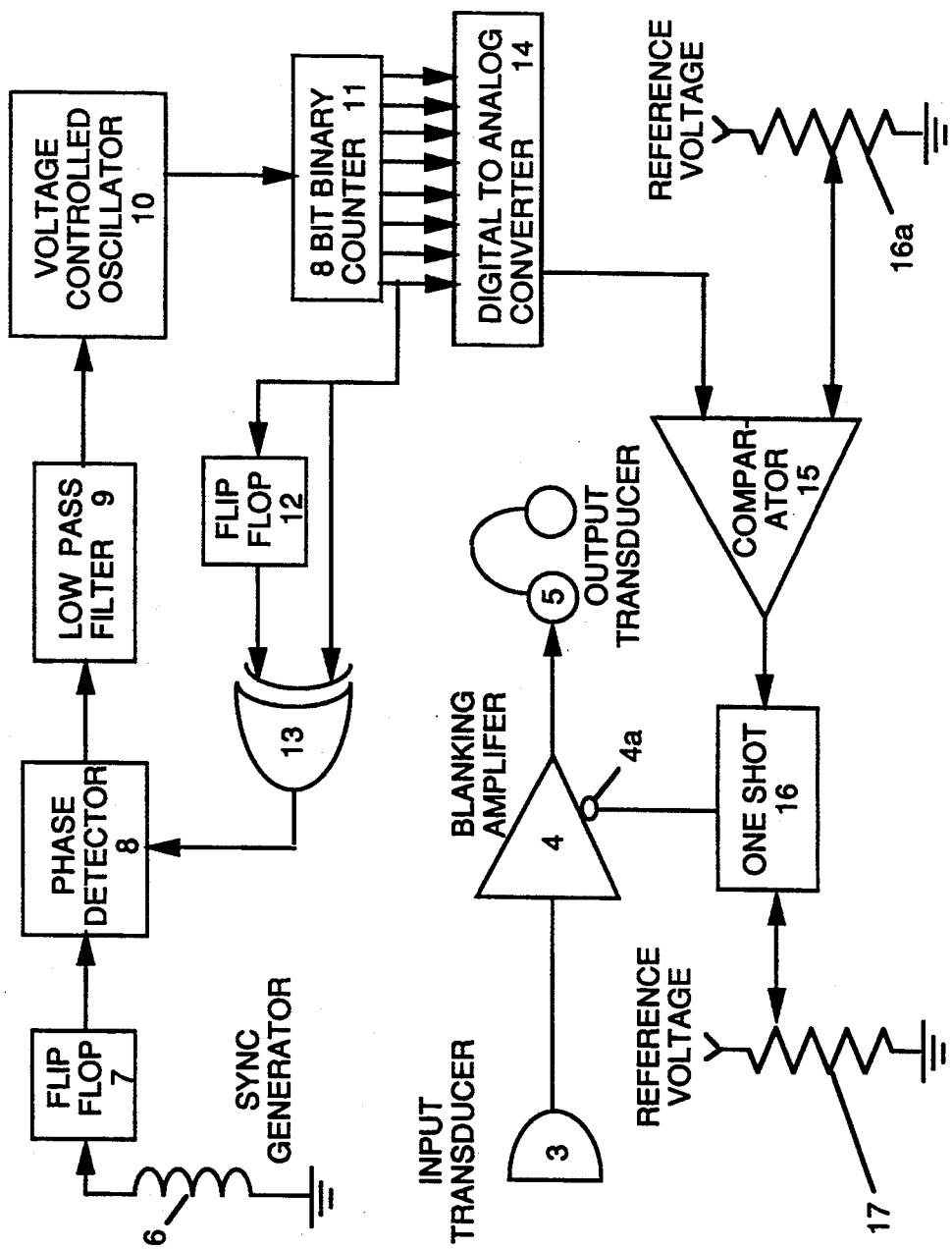
FIG. 1 is a block diagram of the invention and FIG. 2 is a timing diagram that is helpful in understanding the operation of the invention.

Referring to FIG. 1, a sound conductor, comprised of a long thin metallic rod, is placed in contact with the machinery under test. The sound conductor transmits the sounds and vibrations of the machinery to the input transducer 3 comprised of a microphone attached to the other end of the sound conductor.

The output of the microphone is coupled to the input of the blanking amplifier 4. The output of the blanking amplifier is an amplified version of the input when enabled by the control input 4A and zero volts otherwise. The output of the blanking amplifier 4 is coupled to the output transducer 5 which is comprised of a headset loudspeaker.

The sync generator 6 emits a voltage pulse each time the machinery passes through a reference position in its operational cycle. For operation with a spark ignition engine the sync generator comprises a coil of wire wrapped around the spark plug wire of the number one cylinder. A sync pulse is generated by inductive coupling to the spark plug current. Various other devices, such as variable inductors or capacitors, magnetic pickups or optical sensors, can be employed for other types of cyclical machinery.

The sync pulse occurs at the start of each cycle of the machinery and is coupled to the input of a flip flop 7. Each occurance of the sync pulse causes the flip flop 7 to toggle its output state. The output of the flip flop 7 is a square wave with one half the the sync pulse frequency and comprises one input to the phase detector 8.

The phase detector 8, the low pass filter 9, and the voltage controlled oscillator 10 comprise the feed forward path of a phase locked loop. The 8 bit binary counter 11, the flip flop 12 and the exclusive or gate 13 comprise the feedback path of the phase locked loop. The output of the exclusive-or gate 13, which functions as a ninety degree phase shifter, is coupled to the other input of the phase detector 8.

By principles well known to practitioners of the art, the feedback action of the phase locked loop causes the two inputs to the phase detector 8 to be locked in frequency and phase quadrature and the numerical value contained in the binary counter 11 to represent the fractional phase of the sync pulse sequence and the instantaneous phase of the machinery cycle.

The numerical value contained in the 8 bit binary counter 11 is coupled to the input of a digital to analog converter 14 which produces a sawtooth waveform which is an analog representation of the instantaneous fractional phase of the machinery cycle. The output of the digital to analog converter 14 is coupled to one input of the comparator 15.

Figure 2:
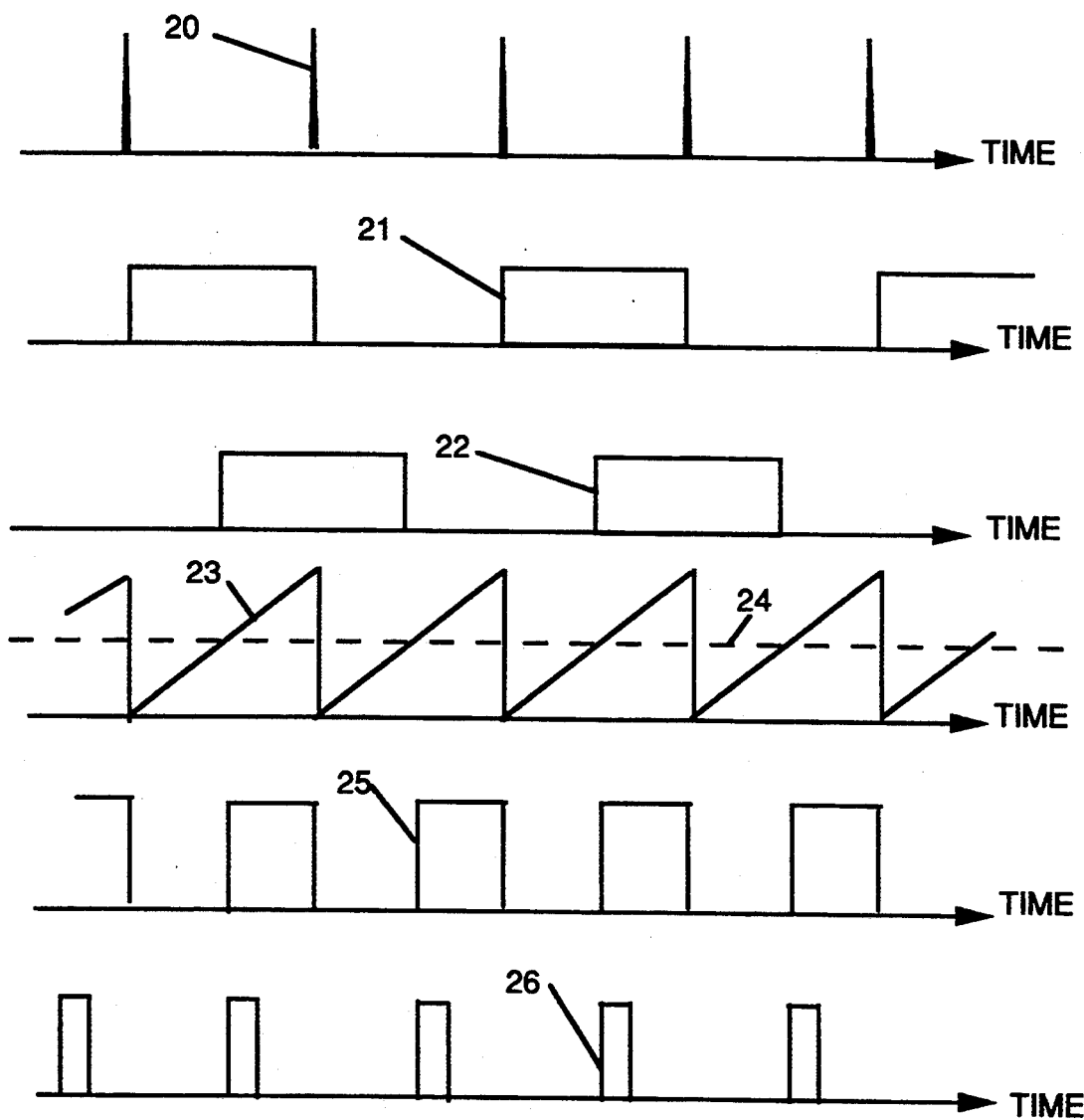

Potentiometer 16 is connected to a reference voltage at one end and electrical ground at the other end. Operator adjustment of the potentiometer 16a produces the observation phase control signal which is a voltage at the potentiometer wiper proportional to the machinery phase position to be observed and which is coupled to the other input of comparator 15. The comparator 15 outputs a low voltage when the analog converter 14 output is less than the observation phase control signal and a high voltage otherwise. The output of the comparator 15 is coupled to the trigger input of the one shot 16. When the trigger input voltage transitions from low to high voltage, the one shot 16 emits a pulse with width controlled by the operator setting of the variable resistor 17. The output of the one shot 16 is the sequence of observation pulse which is coupled to the control input 4A of the blanking amplifier 4. During the observation pulses the blanking amplifier connects the output of the input transducer 5 to the input of the output transducer 5. At other times they are disconnected. Referring to FIG. 2, the sync pulse sequence 20 is a train of pulses which individually occur when the machinery passes through a reference position. The input to the phase locked loop is a square wave with one half the sync pulse frequency 21. The feedback input 22 to the phase detector 8 is a square wave in phase quadrature with the the input to the phase locked loop. The output 25 of the analog to digital converter 14 is a sawtooth waveform which represents the instantaneous phase of the machinery. One cycle of this saw tooth waveform corresponds to one cycle of the machinery. The dotted line 24 represents the operator designated observation phase control signal. The output 25 of the comparator 15 is a pulse train with leading edges coincident with the arrival of the machinery at the designated observation phase position. The output of the one shot 16 is a sequence of observation pulses 26 with leading edges coincident with the comparator output transitions and with widths proportional to the operator setting of variable resistor 17. The blanking amplifier 4 connects the input transducer 3 to the output transducer 5 only when enabled by the observation pulse 26 so that only the operator designated segment of [he machinery cycle is audible at the output.

I claim:

1. A device for testing and diagnosing machinery which comprises:

an input transducer comprising an acoustic input port coupled to the machinery under test, an electrical output port and means for converting the sound and vibration at the input port into an electrical signal at the output port, an output transducer comprising an electrical input port and an acoustic output port and means for converting the electrical signal at the input port into an acoustic signal at the output port, and means for connecting the electrical output port of the input transducer to the electrical input port of the output transducer only during an operator designated segment of the cycle of the machinery under test;

whereby the means for an operator to produce an observation phase control signal which is proportional to the phase position of the machinery under test which the operator desires to observe, a sync generator which is attached to the machinery under test and which sync generator produces a sequence of sync pulses corresponding to the times that the machinery under test passes through a reference position, a phase locked loop with the sequence of sync pulses as input and with the output equal to the instantaneous phase position of the machinery under test, means to produce an observation pulse when the instantaneous phase position of the machinery becomes greater than the observation phase control signal, and means to control the width of the observation pulse, and a blanking amplifier which connects the output of the input transducer to the input of the output transducer only for the duration of the observation pulse and which disconnects the input transducer at all other times.

* * * * *